July 7, 1936. J. B. WHITTED 2,046,495
WIPER ARM AND BLADE CONNECTION
Filed Jan. 4, 1934
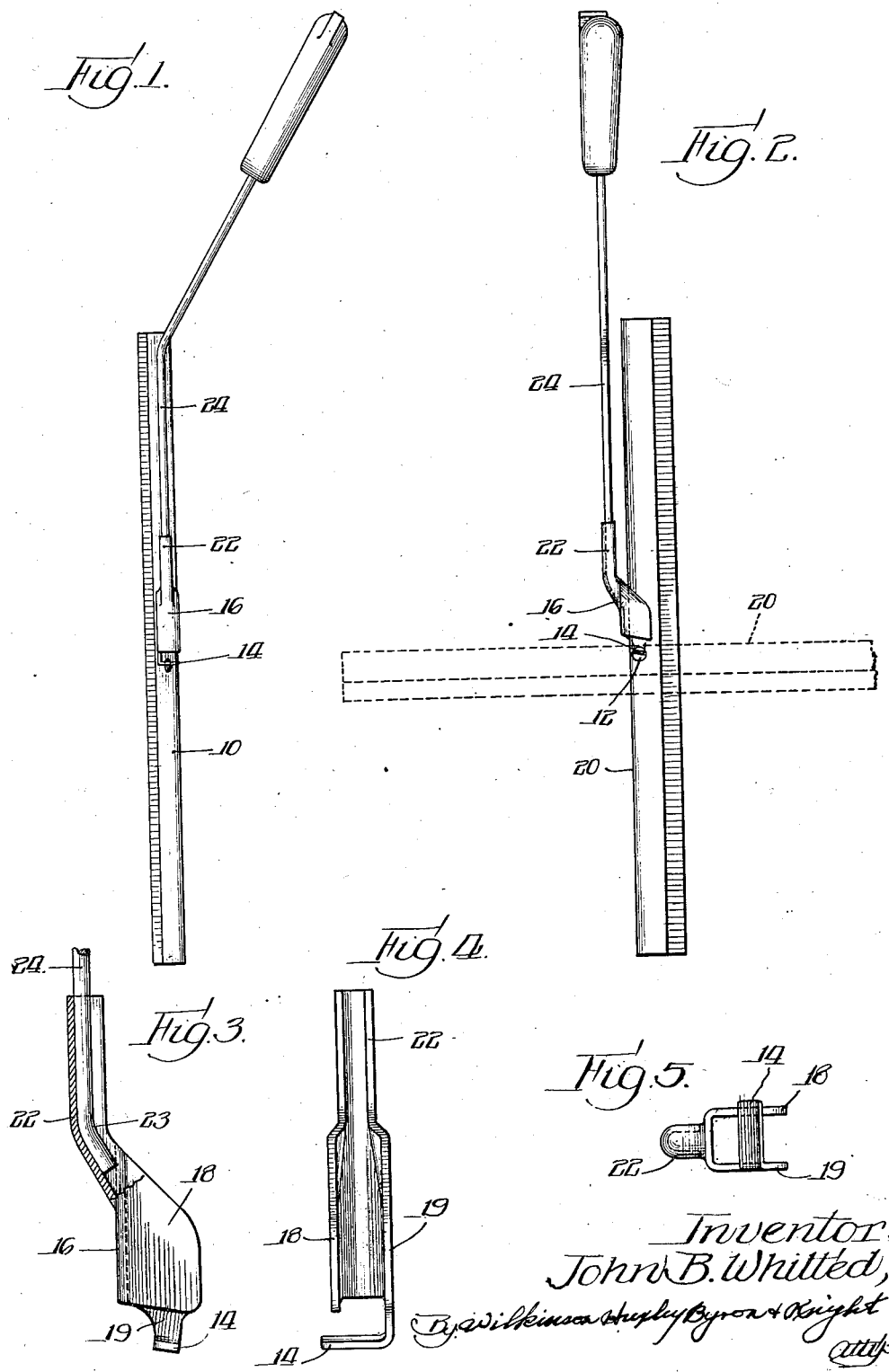
Inventor:
John B. Whitted, Patented July 7, 1936

2,046,495

UNITED STATES PATENT OFFICE 2,046,495

WIPER ARM AND BLADE CONNECTION

John B. Whitted, Evanston, Ill., assignor to Stewart-Warner Corporation, Chicago, Ill., a corporation of Virginia Application January 4, 1934, Serial No. 705,167

6 Claims. (Cl. 15—250)

My invention relates to windshield wipers and particularly to the clip by which the squeegee blade of a windshield wiper may be attached to the operating arm for the squeegee blade.

It is desirable in a device of this kind to provide a clip, for attachment of the squeegee blade to the operating arm of a windshield wiper, which will permit a ready detachment of the squeegee blade in order that new blades may be substituted for old when the old blade has become worn and consequently inefficient as a cleaning medium.

It is desirable also in a clip of this kind to allow the wiper blade a limited amount of angular displacement or "flop" in order that the blade may fall first on one side when operating in one direction and the other when operating in reverse direction.

In the past, while such clips or attachment devices have been provided which would accomplish the above desired results, most of them have been relatively expensive to manufacture when viewed with regard to the simple function they are to perform. It is an object of my invention to provide a clip or attachment means which is simpler and cheaper to manufacture than those previously known, and which will at the same time accomplish the above mentioned desirable results.

It is also a particular object of my device to provide a clip which will not obstruct the view and which is neat and pleasing in appearance.

In general, I accomplish these ends by means of a single stamped member, which is fastened by a means to be described later to the operating arm and by a hook-like projection to the wiper blade. This stamping has side walls to limit the amount of "flop" of the blade, and which also serve to hold the blade so that it may not turn with respect to the operating arm.

A more thorough understanding of my invention may be had by one skilled in the art by reference to the accompanying drawing, in which:

Figure 1 is a front elevation of the wiper arm and blade in operative position;

Figure 2 is a side elevation showing in dotted lines the position of the blade for assembly with respect to the arm;

Figure 3 is an enlarged view of the clip partially in section to illustrate its connection with the wiper arm;

Figure 4 is a side view of the clip, and

Figure 5 is an end view of the clip.

The wiper blade 10, shown in Figures 1 and 2, may be of any conventional type and is provided with a hole 12 whereby the blade may be assembled with respect to a hook-like projection or tongue 14 of the attaching clip 16. The clip 16, which is formed as a stamping, includes side walls or flanges 18 and 19, which are spaced apart a distance slightly greater than the thickness of the wiper blade 10, whereby the blade may have a limited amount of angular displacement during its movement in opposite directions. The hook-like projection 14 extends from the side wall 19 transverse with respect to but spaced from the bottom edge of the wall 18 and, as shown in Figure 4, extends slightly beyond the side wall 18. The space between the projection 14 and the wall 18 is sufficient to permit assembly of the blade with respect to the clip and particularly to permit the outer edge 20 of the blade to clear the lower edge of the side wall 18 during assembly, as illustrated in dotted lines in Figure 2. Due to the length of the hook or tongue 14, the wiper blade will not become detached therefrom during operation.

As shown in Figure 3 the stamped clip is provided with an offset channel-shaped portion 22 adapted to receive a bent portion 23 at the lower end of the operating arm 24. The walls of the channel-shaped portion are stamped over the portion 23 of the arm and because of the bend in the arm, any torsional strain upon the clip will not cause it to turn about the operating arm 24.

To connect the clip to the wiper blade, the blade is brought to position with the hole adjacent the hook-like portion and with the blade substantially at right angles to the operating arm. In this position, it will be possible to slip the hook-like projection into the hole in the wiper blade. The wiper blade may then be turned to position substantially parallel to the operating arm and it will be seen that in this position the blade will be held so that it cannot be disengaged from the hook. It is to be noted that the hook-like projection or tongue 14 moves endwise into the hole or opening instead of edgewise and substantially axially or centrally of the opening instead of radially of the opening. The opening 12 when defined as a "closed opening" in the claims is intended to distinguish from an opening which has a radial entrance slot, such as a key-hole opening.

While I have described one specific embodiment of my invention, I do not intend to limit myself to this particular form.

I claim:

1. In a windshield wiper, a wiper arm and a wiper blade, said blade having a lateral opening therethrough spaced from the edges thereof, a tongue on said arm adapted to enter said opening endwise, said blade being free to swing on said tongue to its normal operating position with respect to said arm and means on said arm positioned to engage said blade to prevent lateral separation while said blade is in operative position with respect to said arm and to be disengaged from said blade when the blade is swung about the tongue to a position other than said operative position.

2. In a windshield wiper, a wiper arm and a wiper blade, said blade having a lateral opening therethrough spaced from the edges thereof, said arm being formed with a bent tongue at one end thereof adapted to enter said opening endwise to support said blade on said arm, said arm being formed with spaced flanges adapted to receive said blade as it is moved on said tongue to its normal operating position, said flanges serving to prevent lateral separation of said blade with respect to said arm when said blade is in operating position with respect to said arm and to permit separation of the blade from the arm when the blade is swung about the tongue to a position other than said operative position.

3. In a windshield wiper, a wiper arm, a wiper blade, a stamped clip formed for securement to said arm and for detachable support on said blade, said blade having a lateral opening therethrough spaced from the edges thereof, said clip being formed with a bent tongue adapted to enter said opening endwise and centrally of said opening, and said clip having spaced flanges between which said blade is retained in normal operation, said flanges permitting the blade to be disengaged from the tongue when the blade is swung on said tongue to a position other than its normal operating position.

4. In a windshield wiper, a wiper arm and a wiper blade, and a stamped clip secured to said arm and adapted to detachably support said blade on said arm, said blade having a lateral opening therethrough spaced from the edges thereof, said clip having a tongue thereon and said clip being formed to permit assembly of said blade with respect to said clip so that said tongue may be received endwise in said opening, said blade being free to swing about said tongue from its assembled position to normal operating position, said clip being formed with a channel-shaped portion positioned to receive said blade in its operating position to retain said blade in supporting relationship with respect to said tongue, and to permit the blade to be disengaged from the tongue when the blade is swung about the tongue to a position other than its operation position.

5. In a windshield wiper, a wiper arm, a wiper blade, and a stamped clip through which said blade is detachably secured to said arm, said clip having a stamped channel-shaped portion adapted to receive said arm and to be clamped securely thereto, said clip being formed with spaced side walls adapted to receive said blade when said blade is in operative position with respect to said arm, one of said side walls having a bent tongue extending slightly beyond the other of said side walls and spaced therefrom, said blade being formed with a lateral opening therethrough spaced from the edges thereof to receive said tongue endwise and centrally of said opening as said blade is assembled laterally with respect to said arm, said blade being free to swing upon said tongue into operative position in which it is retained against displacement with respect to said tongue by said side walls.

6. In a windshield wiper, a wiper arm having a bend adjacent the end thereof, a metal stamping clamped to and substantially enclosing the bend of said arm so as to resist rotation relative to said arm, a hook-like projection on said stamping, a wiper blade having a lateral opening therethrough spaced from the edges thereof adapted to engage said hook-like projection, and spaced walls on said metal stamping adapted to receive said blade therebetween so as to prevent separation of said blade from said arm, said walls permitting slight angular displacement of said blade during its operation and permitting the arm to be disengaged from the tongue when the blade is swung about the tongue a material amount to a position away from the position between said spaced walls on the metal stamping.

JOHN B. WHITTED.